United States Patent Office 2,803,669
Patented Aug. 20, 1957

2,803,669

METHOD OF REDUCING THE HALOGEN CONTENT OF HALOPHENOLS

Arthur E. Brainerd, Jr., and Noland Poffenberger, Midland, Mich., assignors to The Dow Chemical Company, Midland, Mich., a corporation of Delaware No Drawing. Application December 27, 1955, Serial No. 555,291

4 Claims. (Cl. 260—621)

This invention relates to a method for reducing the chlorine or bromine content of halophenols. Thus, it relates to a method for converting polyhalogenated phenols to halophenols of lower halogen content and to a method for converting monohalophenols to phenols.

In the halogenation of phenol, to produce mono- and polyhalophenols, mixtures of the several isomers of the mono-, di-, tri- and tetrahalophenols are obtained. Similarly, when polyhalogenated benzenes are subjected to hydrolysis, there is usually obtained a mixture of halophenols. For many uses, certain isomers of each level of halogenation are more desirable than others. Thus, there are more uses for the mono-4-halophenols than for the corresponding 2-halo-compounds; the 2,4-dihalophenols are the most widely used; the 2,4,5-trihalophenols are most desired at this level of halogenation; and, the 2,3,4,6-tetrahalophenols are the preferred tetrahalo compounds for some purposes. When the several isomers are prepared together, and only one is widely used, this leaves a supply of halophenols which can only be halogenated further to form such higher compounds as pentahalophenol, or, if this is impractical, the unwanted isomers must be discarded. This is wasteful of phenolic values and contributes to the high cost of the isomers which are used.

Further, it is common experience, when halogenating phenols to a desired average halogen content to find that the reaction product contains some underhalogenated and some overhalogenated compounds. The former, if separated from the mixed product, can be returned to the next reactor batch, but the overhalogenated product is waste unless used to prepare one of the more highly halogenated phenols.

It would be desirable to have, and it is the principal object of this invention to provide, a method for converting halogenated phenols to phenols of lower halogen content.

The foregoing and related objects are attained, according to the invention, by bringing the vapor of a chlorinated or brominated phenol into contact with gaseous hydrogen and a solid catalyst comprising a cuprous halide supported on porous activated alumina. The weight of cuprous halide should be in the range from 1 to 25 percent of the weight of the alumina support. The temperature at which the reaction (sometimes referred to herein as dehalohydrogenation) occurs at a significant rate is in the range from 350° C. to 550° C. Optimum reaction conditions are encountered when the halophenol vapors and hydrogen are brought together at such a temperature in a fluidized bed of the cuprous halide on porous activated alumina catalyst.

The hydrogen for use in the process is supplied preferably from an outside source, but may be generated in the reaction zone, suitably by feeding thereto steam and methane or other material capable of undergoing some variation of the watergas reaction. Thus:

$$CH_4 + H_2O \rightarrow CO + 3H_2$$

Some of the halophenol may undergo similar decomposition when steam is fed to the system. For example, starting with a dichlorophenol:

$$C_6H_3Cl_2OH + 5H_2O \rightarrow 6CO + 2HCl + 6H_2$$

Regardless of the source of the hydrogen, a dichlorophenol will be dechlorohydrogenated under the specified conditions and, depending on the ratio of hydrogen to halogen present, the product of the lower chlorine content may be one or a mixture of monochlorophenols and phenol:

$$C_6H_3Cl_2OH + H_2 \rightarrow C_6H_4ClOH + HCl$$
$$C_6H_4ClOH + H_2 \rightarrow C_6H_5OH + HCl$$

The reaction of dehalohydrogenation is exothermic, and it has been found that it is more difficult to control the reaction and to obtain commercially satisfactory results in a fixed bed reactor or in a moving bed reactor, than when using a fluid bed, even when using the improved catalyst mass of the present invention, because of the development of hot spots and resultant excessive deposition of carbon. It is possible to use the present catalyst, however, in fixed or moving beds more satisfactorily than any prior suggested catalyst. Instantaneous uniformity of temperature in the reaction zone is an inherent attribute of fluidized bed reaction zones, and, in the present process, a fluid bed reactor gives the most successful operation.

The catalyst system must be one which is not poisoned by halogen compounds, and, for preferred operations it must be in a form capable of being fluidized by the passage of gases or vapors therethrough, suitably those of the reagents. The catalyst must also have large surface area per unit mass or volume and must be hard enough so as not to crumble on contact with other like particles or with the vessel walls but not so hard as to be excessively abrasive. The desired combination of properties is found in a mass of surprising catalytic activity and durability formed by impregnating graded particles of activated alumina with a chloride of copper in amount to represent from 1 to 25 and preferably from 2 to 20 percent by weight of cuprous chloride, based on the weight of alumina. For convenience, because of its greater solubility, cupric chloride solution is used to impregnate the alumina. Cupric compounds, such as chloride or oxide, are reduced to cuprous compounds and, if necessary, converted to halide under conditions of the reaction. The porous activated alumina employed may be any of the grades of partially hydrated predominantly gamma alumina which are prepared commercially by calcining a rock-like alumina trihydrate derived from bauxite. Non-porous native or fused aluminas are unsatisfactory. Examples of suitable grades of commercial activated alumina are Alcoa grades F–1, F–10 and XF–21. These may be in the form of crushed and sieve-graded particles or they may be in the commercially available microspherical bead form. The catalyst mass has been found to be most effective when it is substantially free from sodium, potassium and sulfur compounds.

The following examples illustrate the practice of the invention:

*Example 1*

A catalyst mass was prepared by impregnating porous activated alumina (grade F–1, particle size 5–12 mesh, U. S. sieve series) with 15 percent of its weight of cupric chloride, and reducing the latter to cuprous chloride by contact with gaseous ethylene at 480° C. in a fixed bed reaction tube. Orthochlorophenol was fed to the catalyst bed while the latter was kept at about 490° C. The rate of feed of orthochlorophenol was about 3.86 gram mols per hour. Hydrogen was supplied to the reaction zone at a rate of about 1.79 gram mols, or 44,100 cc. per hour, which is 46.5 percent of the amount theoretically required to reduce all of the orthochlorophenol to phenol. The effluent from the reactor comprised condensable vapors and noncondensable gases. The vapors were condensed and the liquid condensate was fractionated and found to contain minor amounts of benzene, chlorobenzene and water, accounting for less than 5 percent of the feed, and a major proportion of phenolic matter consisting of about 60 percent orthochlorophenol and about 40 percent phenol. The phenolic portions of the product accounted for about 92 percent of the feed. The noncondensable gases consisted chiefly of hydrogen chloride with a small amount of unreacted hydrogen and of carbon monoxide. About 3 percent of the feed was carbonized in the reactor.

*Example 2*

In a similar manner, 2,3,4,6-tetrachlorophenol was subjected to the action of 2 mols of hydrogen per mol of the phenol, over the same catalyst and in the same reactor. The phenolic portion of the condensate contained the following identifiable phenolic compounds:

| | Mol percent |
|---|---|
| 2,3,4,6-tetrachlorophenol | approx. 5 |
| 2,3,4-trichlorophenol | approx. 5 |
| 2,3,6-trichlorophenol | approx. 5 |
| 2,4,6-trichlorophenol | approx. 5 |
| 2,3-dichlorophenol | approx. 5 |
| 2,4-dichlorophenol | approx. 40 |
| 2,6-dichlorophenol | approx. 10 |
| 2,5-dichlorophenol | approx. 5 |
| o-Chlorophenol | approx. 5 |
| m-Chlorophenol | approx. 5 |
| p-Chlorophenol | approx. 5 |
| Phenol | approx. 5 |

*Example 3*

2,4,6-trichlorophenol was fed to a fluidized bed of 20 percent cuprous chloride on porous activated alumina (grade F-10, particle size 40-100 mesh), at a temperature of 450° C., together with 1 mol of hydrogen per mol of the phenolic compound, and enough nitrogen to maintain the bed in a fluidized condition. The objective was to produce principally 2,4-dichlodophenol. The phenolic portion of the condensed vapors from the effluent stream consisted of

| | Mol percent |
|---|---|
| 2,4,6-trichlorophenol | approx. 10 |
| 2,4-dichlorophenol | approx. 50 |
| 2,6-dichlorophenol | approx. 25 |
| o-Chlorophenol | approx. 10 |
| p-Chlorophenol | approx. 3 |
| Phenol | approx. 2 |

The procedure of the examples produces analogous results when the halophenol to be dehalohydrogenated is a bromophenol.

We claim:

1. The method which comprises bringing the vapor of at least one halophenol of the class consisting of the chloro- and bromophenols and hydrogen into intimate contact with a cuprous halide of the class consisting of the chloride and bromide supported on porous activated alumina, the amount of cuprous halide being from 2 to 25 percent of the weight of alumina, at a reaction temperature in the range from 350° to 550° C., and recovering a phenolic product containing less halogen than the halophenol supplied to the reaction.

2. The method claimed in claim 1, wherein the cuprous halide on alumina is a fluidized bed in the reaction zone.

3. The method claimed in claim 1, wherein the halophenol reagent is a chlorophenol.

4. The method claimed in claim 1, wherein the halophenol reagent is a polychlorophenol.

References Cited in the file of this patent

UNITED STATES PATENTS 2,576,161  Thompson _____ Nov. 27, 1951

FOREIGN PATENTS 516,523  Belgium _____ June 24, 1953

OTHER REFERENCES

Ellis: "Hydrogenation of Organic Substances," 3rd, ed. (1930), page 301 (1 page only).